(12) United States Patent
Desai et al.

(10) Patent No.: US 12,550,073 B2
(45) Date of Patent: Feb. 10, 2026

(54) ADAPTIVE TRANSMIT POWER CONTROL THRESHOLD RECOMMENDATIONS

(71) Applicant: Cisco Technology, Inc., San Jose, CA (US)

(72) Inventors: Vishal S Desai, San Jose, CA (US); Young Il Choi, San Jose, CA (US); Jim Florwick, Frederick, MD (US)

(73) Assignee: Cisco Technology, Inc., San Jose, CA (US)

( * ) Notice: Subject to any disclaimer, the term of this patent is extended or adjusted under 35 U.S.C. 154(b) by 470 days.

(21) Appl. No.: 18/310,961

(22) Filed: May 2, 2023

(65) Prior Publication Data
US 2024/0373367 A1    Nov. 7, 2024

(51) Int. Cl.
*H04W 52/24* (2009.01)
(52) U.S. Cl.
CPC ....... *H04W 52/242* (2013.01); *H04W 52/241* (2013.01)
(58) Field of Classification Search
CPC .......................... H04W 52/242; H04W 52/241
See application file for complete search history.

(56) References Cited

U.S. PATENT DOCUMENTS

| | | | | |
|---|---|---|---|---|
| 11,252,672 | B1 * | 2/2022 | Nuvvula | ............... H04W 24/10 |
| 2016/0165555 | A1 | 6/2016 | Jeong et al. | |
| 2016/0227489 | A1 | 8/2016 | Oteri et al. | |
| 2020/0389854 | A1 | 12/2020 | Kandasamy et al. | |
| 2024/0064577 | A1 * | 2/2024 | Wahid | ............... H04W 28/0289 |
| 2024/0357489 | A1 * | 10/2024 | Akdim | ................... H04W 76/11 |
| 2024/0357517 | A1 * | 10/2024 | Yu | ........................ H04W 52/242 |

OTHER PUBLICATIONS

Cakir et al., "DTWN: Q-learning-based Transmit Power Control for Digital Twin WiFi Networks," EAI Endorsed Transactions on Industrial Networks and Intelligent Systems, Apr. 2022-Jun. 2022, vol. 9, Issue 31, E5 pp. 1-10.
Chincoli et al., "Predictive Power Control in Wireless Sensor Networks," 2016 IEEE First International Conference on Internet-of-Things Design and Implementation, pp. 1-4.

* cited by examiner

Primary Examiner — Fayyaz Alam
(74) Attorney, Agent, or Firm — Polsinelli P.C.

(57) ABSTRACT

Disclosed are systems, apparatuses, methods, and computer-readable media for adaptive transmit power control threshold recommendations in wireless networks. A method includes: retrieving network usage information from APs associated with a location, wherein the network usage information identifies network consumption information of each wireless device connected to that AP, non-period events, and interrupts, wherein the network usage information from a first AP includes a path loss associated with messages from neighboring APs; determining first TPCs for each AP of the APs associated with the location based on path losses between each AP; simulating network performance using the first TPCs and the network usage information; and measuring network performance information associated at each AP based on the simulation of the network performance; and determining second TPCs for each AP of the APs associated with the location based on the network information.

20 Claims, 10 Drawing Sheets

ADAPTIVE TRANSMIT POWER CONTROL THRESHOLD RECOMMENDATIONS

TECHNICAL FIELD

The disclosure relates generally to communication networks and, more specifically but not exclusively, to adaptive transmit power control threshold recommendations.

DESCRIPTION OF THE RELATED TECHNOLOGY

Wireless systems employ processes to manage the radio resources of the wireless devices to optimize parameters including channelization, transmit power, etc. The management of the radio helps avoid or mitigate issues with signal interference, bandwidth contention, etc. Newer wireless local area network (LAN) standards increase frequency and bandwidth (e.g., up to 160 MHz) to obtain high data rates. Usage of wider bandwidths contributes to high-frequency reuse, which can cause more interference on at least some channels, among Basic Service Sets (BSSs) in a Radio Frequency (RF) neighborhood. Thus, the Access Points (APs) providing wireless access to the wireless LAN (WLAN) must carefully administer Radio Resource Management (RRM) to balance the higher bandwidth capacity and the increased interference potential (caused by overlapping spectrum) when selecting the higher bandwidths.

APs may rely on other communications technologies to connect to the rest of the network/Internet. One of the most common connections is an Ethernet switch, which may be directly connected to the AP. APs can also use other technologies as a backhaul, such as 5G networks or Data Over Cable Service Interface Specifications (DOCSIS). The realized capacity that the AP can provide to stations connected to the AP can be bottlenecked by the capacity of the switch and/or backhaul connection. For example, if the switch capacity is only 1 Gbps, then the stations connected to the AP cannot realize the full capacity of the 160 MHz bandwidth channels, which can support as much as 2.3 Gbps. Similarly, the 5G backhaul may have limited data rates, either from physical link capacity limits or from cellular service providers throttling the channel due to tiered plans.

With current RRM techniques, the switch and backhaul limits are not determined or allowed for in the bandwidth allocations, which can lead to wide bandwidth allocation to wireless stations and inefficient resource allocation.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
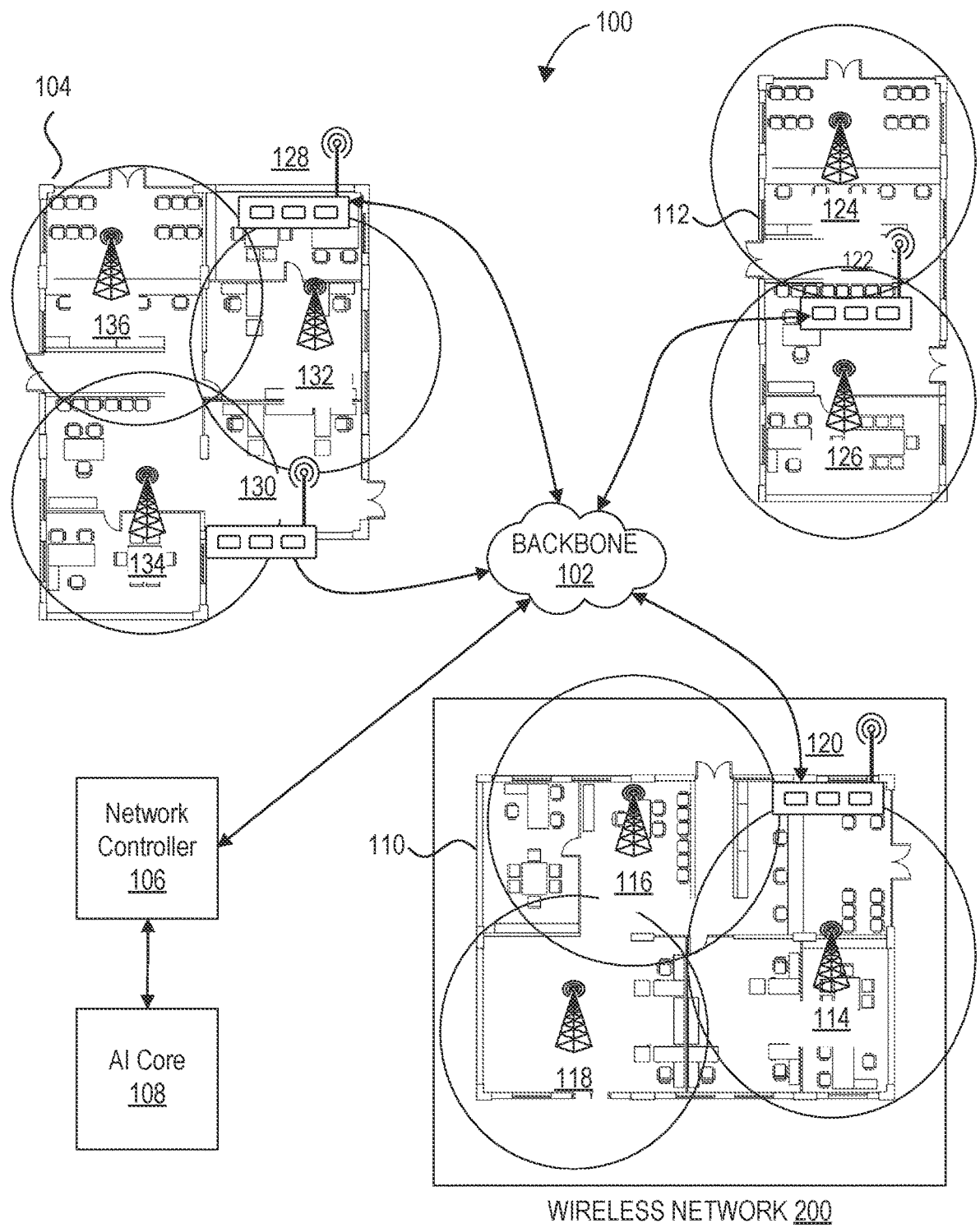
FIG. 1 is a conceptual diagram illustrating a wireless networking environment in accordance with some aspects of the disclosure.

Various embodiments of the disclosure are discussed in detail below. While specific implementations are discussed, it should be understood that this is done for illustration purposes only. A person skilled in the relevant art will recognize that other components and configurations can be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others.

The terms used in this specification generally have their ordinary meanings in the art, within the context of the disclosure, and in the specific context where each term is used. Alternative language and synonyms can be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles can be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Disclosed are systems, apparatuses, methods, computer readable medium, and circuits for providing adaptive transmit power control (TPC) threshold recommendations. According to at least one example, a method includes: retrieving network usage information from access points (APs) associated with a location, wherein the network usage information identifies network consumption information of each wireless device connected to that AP, non-period events, and interrupts, wherein the network usage information from a first AP includes a path loss associated with messages from neighboring APs; determining first TPCs for each AP of the APs associated with the location based on path losses between each AP; simulating network performance using the first TPCs and the network usage information; measuring network performance information associated at each AP based on the simulation of the network performance; and determining second TPCs for each AP of the APs associated with the location based on the network information. For example, the apparatus retrieves network usage information from APs associated with a location, wherein the network usage information identifies network consumption information of each wireless device connected to that AP, non-period events, and interrupts, wherein the network usage information from a first AP includes a path loss associated with messages from neighboring APs; determines first transmit power thresholds (TPCs) for each AP of the APs associated with the location based on path losses between each AP; simulates network performance using the first TPCs and the network usage information; measures network performance information associated at each AP based on the simulation of the network performance; and determines second TPCs for each AP of the APs associated with the location based on the network information.

In another example, an apparatus for providing adaptive transmit power control threshold recommendations is provided that includes a storage (e.g., a memory configured to store data, such as virtual content data, one or more images, etc.) and one or more processors (e.g., implemented in circuitry) coupled to the memory and configured to execute instructions and, in conjunction with various components (e.g., a network interface, a display, an output device, etc.), cause the apparatus to: retrieve network usage information from APs associated with a location, wherein the network usage information identifies network consumption information of each wireless device connected to that AP, non-period events, and interrupts, wherein the network usage information from a first AP includes a path loss associated with messages from neighboring APs; determine first transmit power thresholds (TPCs) for each AP of the APs associated with the location based on path losses between each AP; simulate network performance using the first TPCs and the network usage information; measure network performance information associated at each AP based on the simulation of the network performance; and determine second TPCs for each AP of the APs associated with the location based on the network information.

Example Embodiments

The following description is directed to certain implementations for the purposes of describing innovative aspects of various embodiments. However, a person having ordinary skill in the art will readily recognize that the teachings herein can be applied in a multitude of different ways. The described implementations can be implemented in any device, system, or network that is capable of transmitting and receiving radio frequency (RF) signals according to any communication standard, such as any of the Institute of Electrical and Electronics Engineers (IEEE) IEEE 802.11 standards (including those identified as WiFi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology.

Examples are described herein in the context of systems and methods for adaptive transmit power control threshold recommendations. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In wireless networking, an AP will experience most of the interference based on operation of other APs and wireless stations (STA). TPC and dynamic channel assignment (DCA) may be enabled to manage the RF within a particular region. DCA configures the wireless frequency allocation to encourage frequency diversity of STAs and APs, and TPC provides power control settings to limit an APs coverage area and prevent co-channel and adjacent channel interference.

The conventional design of AP and STAs provide may be based on assumptions, such as an STA will scan each preferred scan channel (PSC) before attempting to select a channel and connect to a network. Another assumption is that STAs will automatically reselect to a different AP once a received signal strength falls below a threshold. In reality, the APs and STAs try to enforce different rules. For example, APs attempt to enforce higher-quality connections by reselecting to other APs with higher-quality signals and STAs attempt to maintain connections to prevent delays, reconnection, and reordering of packets that can happen when reselecting. Incorrectly setting TPC power based on evaluating AP performance does not balance the competing interests within the network environment and does not account for other aspects (e.g., spectral efficiency, the value of measurements at different times, etc.).

A machine learning (ML) approach is described below that incorporates path loss measurements and simulation of real-world performance to improve the quality of TPC recommendations for APs within the network environment. For example, the ML may use a previous day's network information to simulate the performance and optimize network settings based on the simulation.

FIG. 1 illustrates an example of a system network 100 that includes three buildings (i.e., building A 104, building B 110, and building C 112). In this non-limiting example, the building A 104 includes two wireless local area network (LAN) controllers (WLCs) and three APs. Here, a first RF Group is formed among the wireless LAN controller WLC A1 128 and access points AP A1 132 and AP A3 136. A second RF Group is formed by WLC A2 130 and access points AP A2 134. The building B 110 includes a single RF group: wireless LAN controller WLC B 122 and access points AP B1 124 and AP B2 126. Finally, building C 112 includes wireless network 200, which has a single RF group, which is made up of one wireless LAN controller (i.e., WLC 120) and three access points (AP1 116, AP2 114, and AP3 118). The WLCs can be, e.g., a CISCO WLC such as WLC model numbers 9800, 8500, 7500, 5520, 5760, 5508, 3850, and 2500. The WLCs can transmit and receive signals to and from the backbone 102. For example, communications between the backbone 102 and the WLCs can be performed via a control and provisioning of wireless access points (CAPWAP) protocol.

The settings of the WLCs can be controlled by a network controller 106, which communicates with the WLCs via the backbone 102. For example, the network controller 106 can be a CISCO DNA center, which is a centralized intent-based network management system. The network controller 106 can be based in the cloud, for example. Further, an artificial intelligence (AI) core 108 communicates signals to and from the network controller 106. The AI Core 108 can, e.g., signal configuration recommendations, and then some or all of the configuration recommendations can be implemented by the network controller 106, which signals network settings and configurations to the WLCs. The WLCs then apply the configurations and settings to the APs.

For example, the AI Core 108 can receive information such as telemetry data collected on the wireless network 200, and the AI Core 108 processes the received information to generate configuration recommendations for the wireless network 200. The received information may include information related to transmission, reception, interference, exceptions, mitigation events, and so forth. In some aspects, the APs may also collect telemetry information from each other and may communicate using a neighbor discovery protocol (NDP). The AI Core 108 may be, for example, a cloud-based application that learns from the wireless network 200 and from additional wireless networks how best to optimize the network configurations based on data and measured values from the respective networks. The configuration recommendations are then sent from the AI Core 108 to the network controller 106.

The wireless network 200 includes an AI Core 102, a network controller 104, a wireless LAN Controller 106, and several APs (e.g., AP1 116, AP2 114, and AP3 118). Each AP has a surrounding cell in which user devices, such as user equipment 1 (UE1) 202 and user equipment 2 (UE2) 204 can wirelessly communicate with the respective AP of the cell (e.g., cell1 206 surrounds AP1 116; cell2 208 surrounds AP2 114; cell3 210 surrounds AP3 118). As the user device moves from one cell to the next, the user device will change which cell it is communicating with. The wireless network 200 provides wireless communications with one or more wireless devices such as user devices.

A network administrator can interact with the network controller 106 using a graphical user interface (GUI) that enables the network administrator to specify various settings, including, e.g., settings for when to apply configuration recommendations and which of the configuration recommendations to apply at which times and to which parts of the wireless network 200. Then the configuration recommendations can be implemented by the network controller 106 in accordance with the specifications of the network administrator (or other uses).

The wireless LAN controller 120 can communicate with a wide area network (WAN) 206 to allow the user devices to access the internet, for example. The wireless network 200 can be a WiFi network operating in accordance with an IEEE 802.11 protocol.

The AI Core 108 can be used to perform radio resource management (RRM). RRM allows the wireless network 200 to continuously analyze the existing RF environment, and automatically adjust each APs' power and channel configurations to mitigate interference (e.g., adjacent channel interference, co-channel interference, electromagnetic interference, etc.) and signal coverage problems. RRM can reduce the need to perform exhaustive site surveys, and can increase system capacity and provides automated self-healing functionality to compensate for RF dead zones and AP failures. RRM includes several algorithms, which together provide management of the wireless network 200 and are further described in FIG. 3.

Figure 2:
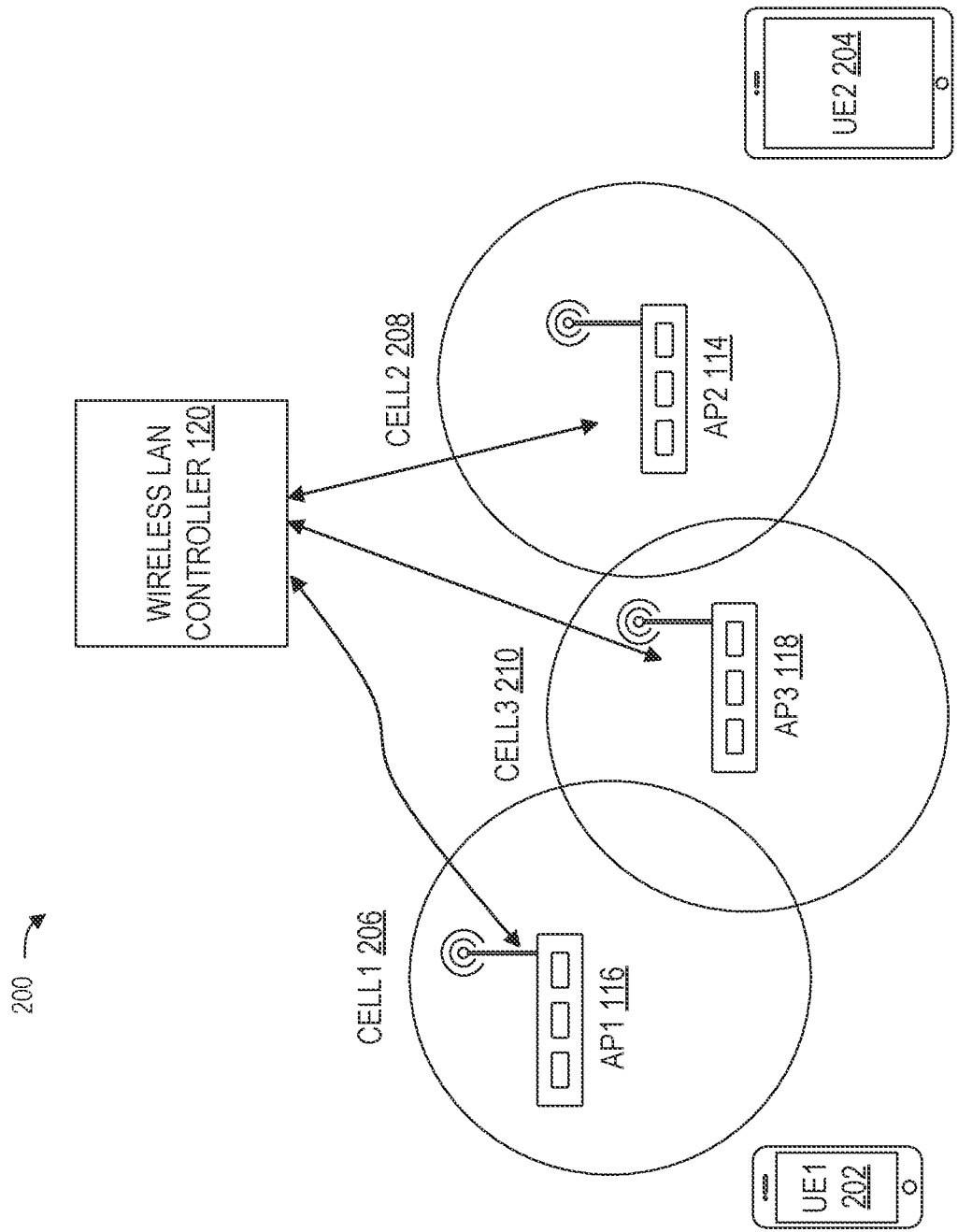
FIG. 2 is a conceptual diagram of an artificial intelligence (AI) core that can be used in a wireless networking environment in accordance with various aspects of the disclosure.
Figure 3:
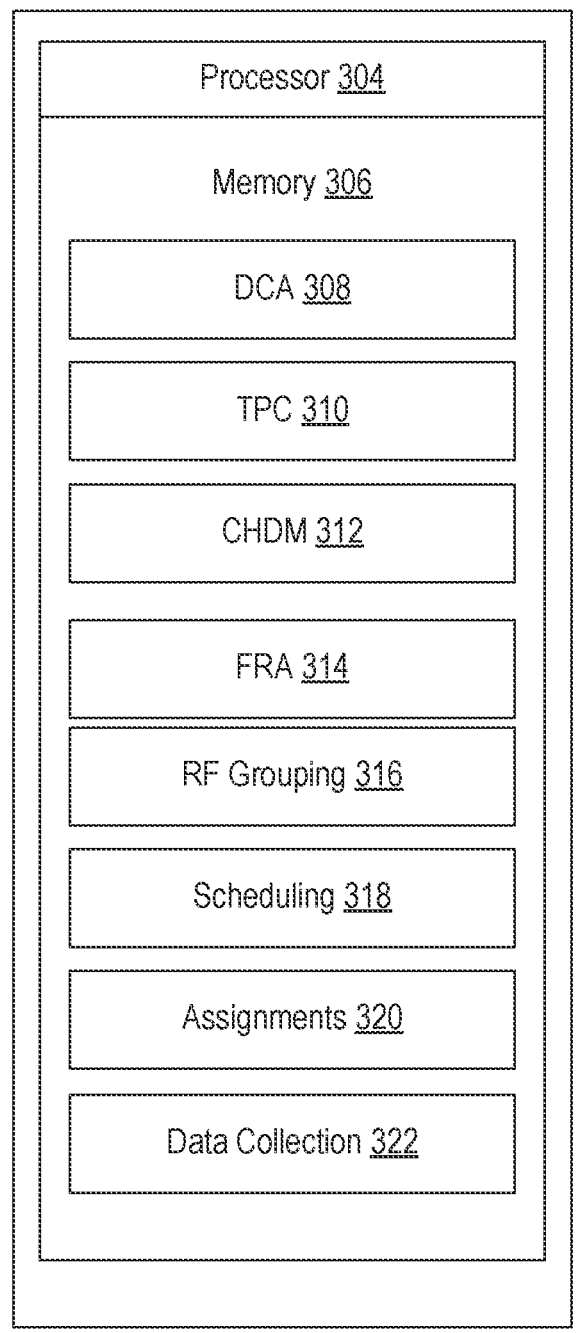
FIG. 3 illustrates a computing device that performs various radio resource management (RRM) functions, in accordance with aspects of the disclosure.

FIG. 3 illustrates a computing device 302 that performs various RRM functions, in accordance with aspects of the disclosure. Computing device 302 can be performed using distributed computing. Some or all of the functions of computing device 302 can be performed by the WLCs and some or all of the functions may be performed by the network controller 106 and/or the AI Core 108. In some examples, the computing device 302 can be an embodiment of the AI Core 108, illustrated in FIG. 2. In some embodiments, the functions attributed to computing device 302 may reside across the AI Core 108, network controller 106, and other devices illustrated in wireless network 200. The computing device 302 includes a processor 304 that performs the steps of the respective methods when executing the respective methods stored in the memory 306. The methods stored in the memory 306 can include, for example: (i) RF Grouping 316 (e.g., an algorithm responsible for determining the RF Group Leader and members); (ii) Flexible Radio Assignment (FRA) 314 (e.g., an algorithm charged with identifying redundant radios resources and re-assigning the resource to a better role); (iii) DCA 308 (e.g., a global algorithm that runs on the RF Group leader); (iv) TPC 310 (e.g., a global algorithm that runs on the RF Group Leader; and (v) Coverage Hole Detection and Mitigation (CHDM) 312 (e.g., a local algorithm that runs on each individual controller).

The respective methods help to maintain optimal performance by optimally applying resources to balance various countervailing interests.

For example, increasing the transmit power in a cell (e.g., cell1 206 of an AP1 116) may help to overcome noise from the environment, but too much of an increase in the transmit power could cause interference with neighboring cells (e.g., cell3 210 of AP3 118), especially in regions where two or more cells overlap. If two cells overlap one another and the cells are on the same channel, then they share the spectral, resulting in diminished communication capacity. Not only are users of each cell sharing the single channel of the available spectral, but the management traffic also increases, which also takes up a part of the channel capacity. The result is higher consumption of airtime and less throughput. This is commonly known as co-channel interference. Assuming that all wireless devices are operating on the same network, two aspects of the wireless network 200 can be controlled to mitigate co-channel interference. For example, to adjust any given cell in response to co-channel interference, the wireless network 200 can adjust the channel plan to facilitate the maximum separation of one AP from another AP on the same channel, and the wireless network 200 can adjust power levels to increase or decrease the size of the effective cells corresponding to respective APs. If more than two channels are available, neighboring cells can operate on different channels, thereby avoiding interference in overlapping regions between cells.

The use of RRM has several advantages including several features which manage specific traffic types or client types which can greatly increase the spectral efficiency and assist RRM in providing a better experience for users. The RRM can be organized according to a hierarchy with an RF Group Name at the top level, then RF Group leader(s) at the next level, which is then followed by RF Neighborhood(s) at the lower level. For any RF Group Name, multiple RF group Leaders may exist (e.g., one or more RF group Leaders frequencies in the 2.4 GHz band and one or more RF group Leader's frequencies in the 5 GHz band). An RF Group Leader can manage multiple RF Neighborhoods.

The RF grouping 316 method is used as the basis for the administrative management domain and the physical management domain within the RF Network. Regarding the administrative domain, proper function of the RRM is based on knowing which APs and controllers are under administrative control for each part of the network. For example, the RF Group name can be an identifier that all controllers and APs within the group will share. Regarding the physical RF domain, the RRM calculates channel plans and power settings based on an awareness of the RF Location of the APs within the network. For example, neighbor messaging can use the RF Group Name in a special broadcast message that allows the APs in the RF group to identify one another and measure their RF Proximity. This information can then be used to form RF Neighborhoods within the RF Group (e.g., a group of APs that belong to the same RF Group that can physically hear one another's neighbor messages above-80 dBm, for example). Each RF Group has at least one RF Group Leader per frequency band (e.g., 2.4 GHz, 5 GHZ, 6 GHZ). The RF Group Leader can be the physical device responsible for: (i) configuration; (ii) running the active algorithms; and (iii) collecting and storing RF-group data and metrics.

In certain non-limiting examples, the NDP is performed by sending an NDP packet from every AP/Radio/Channel on an interval (e.g., every 60 seconds or less). The NDP packet is a broadcast message that APs listen for and allows the AP to understand how every radio on every channel hears every other radio. The NDP packet also provides the actual RF path loss between APs. When an AP receives an NDP message, the AP validates whether the message is from a member of its RF Group. If the NDP message is valid, the AP forwards the message along with the received channel and received signal strength indicator (RSSI) to the controller. The forwarded message is added to the neighbor database, which in turn is forwarded to the RF group leader periodically. For each AP, each radio can store up to a predefined number of neighbors ordered by RSSI high to low. Post-processing of the RSSI information can be used to generate measurements for RX Neighbors (e.g., how the given AP hears other APs) and TX Neighbors (e.g., how other APs hear the given AP).

The FRA 314 uses the NDP messages to locate each radio based on RF distance and evaluate overlapping coverage by cell. Now, the flexible radio assignment 314 method is described according to certain non-limiting examples. First, using the NDP measurements from the APs, FRA plots the x and y coordinates relative to every other AP contained in the solution set (AP Group, physical neighbors). The circumference of each cell is calculated based on the present TX power level of each AP. This produces a logical matrix of the AP's coverage intersections. Based on this understanding, FRA uses a multipoint analysis, to determine the percentage of overlapping coverage for each evaluated AP. The output of this calculation is the Coverage Overlap Factor % (COF). For example, the COF is the percentage of the analyzed cell that is covered at −67 dBm or higher by other radios in service. In the process of calculating this coverage, the FRA method 314 keeps track of radios that are coverage contributors to other radios COF, and the FRA method 314 prevents those radios to be marked redundant as long as a radio they are a contributor for is marked redundant.

Once a radio is marked redundant, the next step depends on the radio configuration. For example, there can be two (or more) operational states to which the flexible radio can be assigned: (i) FRA-auto or (ii) manual. When the radios are in the FRA Auto state, FRA looks to DCA to decide what to do with the now redundant radio(s). DCA's priorities are, first, to try to assign the redundant radio in 5 GHZ and increase capacity, but, if the DCA determines that there is already maximum 5 GHz coverage, the radio will be assigned to a monitor role instead.

In some examples, the DCA 308 monitors the available channels for the RF group and tracks the changing conditions. The DCA then optimizes the RF separation between APs (minimizing co-channel interference (CCI)) by selecting channels that are physically diverse, which maximizes RF efficiency. According to certain non-limiting examples, the DCA can monitor all available channels and develops the cost metric that will be used to evaluate various channel plan options. The cost metric can be an RSSI value comprised of interference, noise, a constant (user sensitivity threshold), and load (if enabled). The Cost Metric equates to a weighted signal-to-noise and interference ratio (SNIR). The Group Leader can maintain the neighbor lists for all APs in the RF Group and organizes these neighbors into RF Neighborhoods. The DCA can use the following metrics, which can be tracked for each AP in the RF Group: (i) same channel contention (e.g., other APs/clients on the same channel—also known as Co-Channel interference or CCI); (ii) foreign channel-rogue (e.g., other non-RF Group AP's operating on or overlapping with the AP's served channel); (iii) noise (e.g., sources of interference such as Bluetooth, analog video, or cordless phones); (iv) channel load (e.g., through the use of industry standard QBSS measurements—these metrics are gathered from the physical PHY layer and are similar to CAC load measurements); and (v) DCA sensitivity (e.g., a sensitivity threshold selectable by the user that applies hysteresis to the evaluation on channel changes). The impact of each of these factors can be combined to form a single RSSI-based metric known as the cost metric. The cost metric then represents complex SNIR of a specific channel, which is used to evaluate the throughput potential of one channel over another. The goal is to be able to select the best channel for a given AP/Radio that minimizes interference.

The transmit power control 210 method balances the competing objectives of increasing signal to noise ratio (SNR) for the current AP while avoiding co-channel interference with neighboring APs. Since one of the major sources of interference in the network is the signals from other/neighboring APs, the transmit power control 210 method is important for optimal performance. That is, DCA and TPC work hand in hand to manage the RF environment. Transmit power largely determines our cell boundaries. The goal is to maximize the RF coverage in the environment without causing co-channel interference.

According to certain non-limiting examples, TPC uses the TX neighbor and RF Neighbor lists generated by the NDP method. RSSI organized lists built on how reception strength (Rx) from other APs (RX Neighbor) and transmit strength (Tx) to other APs (TX Neighbor), to form a picture of the communication strength among the respective APs within the RF Neighborhood and RF Group. Based on this information TPC sets the transmit power of each AP to maximize the coverage and minimize co-channel interference. TPC will adjust the Tx power up or down to meet the required coverage level indicated by the TPC Threshold. TPC runs on the RF Group leader and is a global algorithm that can be sub-configured in RF profiles for groups of APs in an AP group.

According to examples of the disclosure, the CHDM 312 can be used to achieve the following objectives: (i) detect coverage holes, (ii) validate the coverage holes, and (iii) mitigate the coverage holes. That is, CHDM 312 first detects and mitigates coverage holes (if possible without creating other problems) by increasing the transmit power and therefore cell area. According to certain non-limiting examples, CHDM can be a local algorithm that runs independently of RRM and the RF Group leader. To facilitate making decisions at a local level, CHDM can run on every controller. That is, each controller performs coverage hole detection monitoring all associated APs and thus monitoring every attached client and their received signal levels. Mitigation involves increasing the power of an AP, or group of APs to improve coverage levels to a certain area where client signals fall below a customer-selectable threshold.

According to certain non-limiting examples, coverage hole detection can be based on a 5-second (CHD measurement period) histogram of each client's RSSI values maintained by the AP. Values between −90 dBm and −60 dBm are collected in a histogram in 1 dB increments. A client falling below the configured RSSI thresholds for 5 seconds can be marked, e.g., as a pre-coverage hole event.

According to certain non-limiting examples, coverage hole mitigation is a process performed once the decision to mitigate is made. If a coverage hole exists and it meets certain criteria for mitigation (e.g., a minimum number of clients and a minimum percentage), the AP will increase power by one step. CHDM will then continue to run, and if additional mitigation is called for will re-qualify and power will again be increased by 1 step. This incremental approach can prevent wild and unstable swings in power.

Coverage hole mitigation, while operating independently of DCA and TPC, can have a significant effect on surrounding APs and the balance of the RF in an environment. Part of the decision to mitigate is based on an evaluation of whether the mitigation could be successful. Increasing the power of a given AP independently of the RF Group metrics is likely to negatively impact surrounding APs and mitigation be applied judiciously. The combination of the new detection metrics and the power limits included in mitigation make CHDM a stable and predictable.

In addition to the above methods, the memory 306 of the computing device 302 can also store information for scheduling 318, assignments 320, and information for data collection 322. The data collection 322 can include several types of measurements.

With respect to data collection 322, the RRM processes collected data, which is then used in the organization of RRM as well as for processing channel and power selections for the connected APs. Now, a discussion is provided for how and where to configure monitoring tasks, and how the collected data relates to an operational environment.

Channel scanning, such as passive channel scanning, can be performed on all channels supported by the selected radio. Additionally or alternatively, channel scanning can be performed on a set of channels (i.e., the channel set) defined by the DCA method, which can include all of the non-overlapping channels. The channel set can be modified in accordance with user inputs, for example. Additionally, a passive dwell lasting a predefined duration (e.g., 50 msec.) can be used to detect rogue devices, and collect noise and interference metrics. Also, a Neighbor Discovery Protocol Transmission (TX) can be used to send the NDP message from all channels defined to be part of a monitor set.

Figure 4:
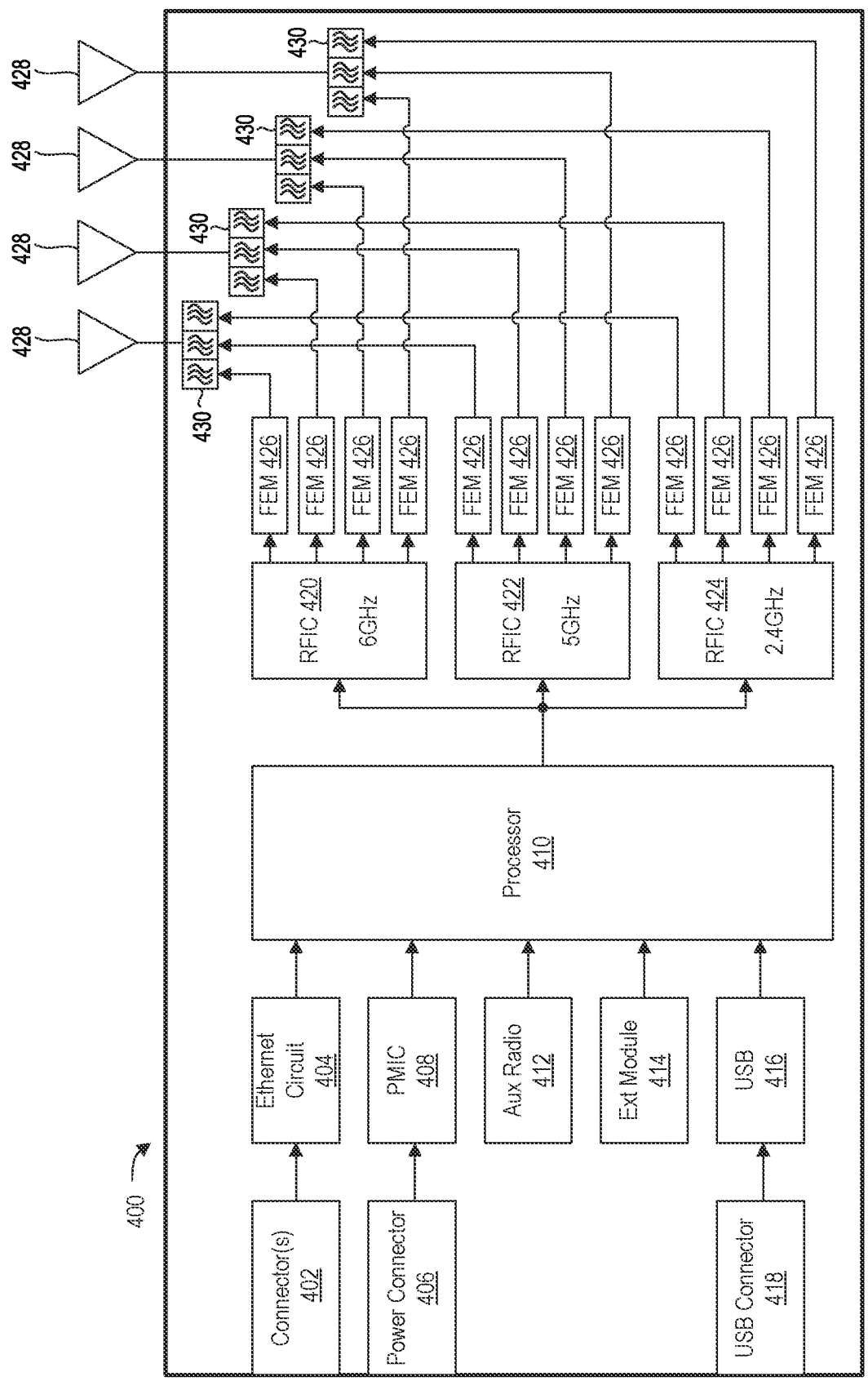
FIG. 4 a block diagram of an access point (AP) configured to bias preferred scan channels, in accordance with aspects of the disclosure.

FIG. 4 a block diagram of an AP, in accordance with aspects of the disclosure. The AP 400 includes at least connector 402 (e.g., RJ45 Ethernet connector, MagJack, wired connector port, etc.) for receiving an Ethernet cable coupled to the connector. In some aspects, the AP includes a plurality of connectors for downstream devices (e.g., for LAN and at least one connector for upstream devices (e.g., for a WAN). In one aspect, the AP 400 can include a coaxial port and a data over cable service interface specification (DOCSIS) for connecting to an internet service provider (ISP). The AP 400 may operate in different modes as described below. The connector 402 is coupled to an Ethernet circuit 404 for sending and receiving signals over a physical media (e.g., an RJ45 cable). In this example, the Ethernet circuit 404 is connected to a processor 410 and provides data to the processor 410, which controls operation of the AP 400.

The AP 400 includes a power connector 406 that is configured to receive power from an external source, which is provided to a power management integrated circuit (PMIC) 408. The PMIC 408 is configured to control power conversion for the AP 400, such as converting AC to DC, stepping down the DC voltage to different DC voltages based on various circuits in the AP 400, and so forth. For example, the processor 410 may use two different voltages based on its operation state and may include a low voltage state in which limited processing occurs to conserve power.

The DC power from the PMIC 408 is provided to one or more AP functions. Non-limiting examples of AP functions include auxiliary connections (e.g., Bluetooth), storage functions, location detection, and so forth. For example, the PMIC 408 may provide power to an auxiliary radio 412 for various functions such as Bluetooth, IoT functions, etc. The AP 400 also includes external module 414 that connects to the processor 400 with a peripheral component interconnect express (PCIe) interface, a universal serial bus (USB) module 416 for interfacing with devices that are connected to the AP 400 via a USB connector 418 (e.g., a printer, an external storage medium), or any other AP function. The non-limiting AP functions and interfaces are examples, and the AP 400 can include additional functions, circuits, and features.

In some aspects, the processor 400 (e.g., a silicon on chip (SOC)) may be connected to radio frequency integrated circuits (RFICs) 420, 422, and 424 for communication (e.g., transmission and reception) with external devices, such as other APs and wireless stations (STAs). In one illustrative aspect, the processor 410 may generate data for transmitting and provide the data to the RFICs 420, 422, and 424 for transmissions on a respective carrier frequency. For example, RFIC 420 is configured to generate a signal in the 6 GHz frequency band, RFIC 422 is configured to generate a signal in the 5 GHz frequency band, and RFIC 424 is configured to generate a signal in the 2.4 GHz frequency band.

Each RFIC includes at least one front-end module (FEM) 426 that integrates multiple devices used to implement the RF front end, including, for example, a power amplifier, low noise amplifier, a mixer, or other components. In this example, the AP 400 includes four antennas 428, with each antenna 428 being connected to a triplexer 430 receiving input from three corresponding FEMs 426. For example, each triplexer 430 is coupled to a corresponding FEM of each RFIC 420, 422, and 426 and connects a corresponding antenna 428 to a corresponding RFIC. The AP 400 is configured to provide data to at least one RFIC 420, 422, and 424 to generate a signal for transmission by a corresponding antenna 428. The AP 400 is also configured to control the RFICs 420, 422, and 424 to receive signals from the antenna 428 and process the signals in the corresponding. In some aspects, each triplexer 430 is configured to connect the corresponding RFIC to an antenna 428.

Although the AP 400 in FIG. 4 is illustrated as a separate device, the AP 400 may be configured to be integral to other components, such as a mobile device or network component that is mounted to a rack.

Figure 5:
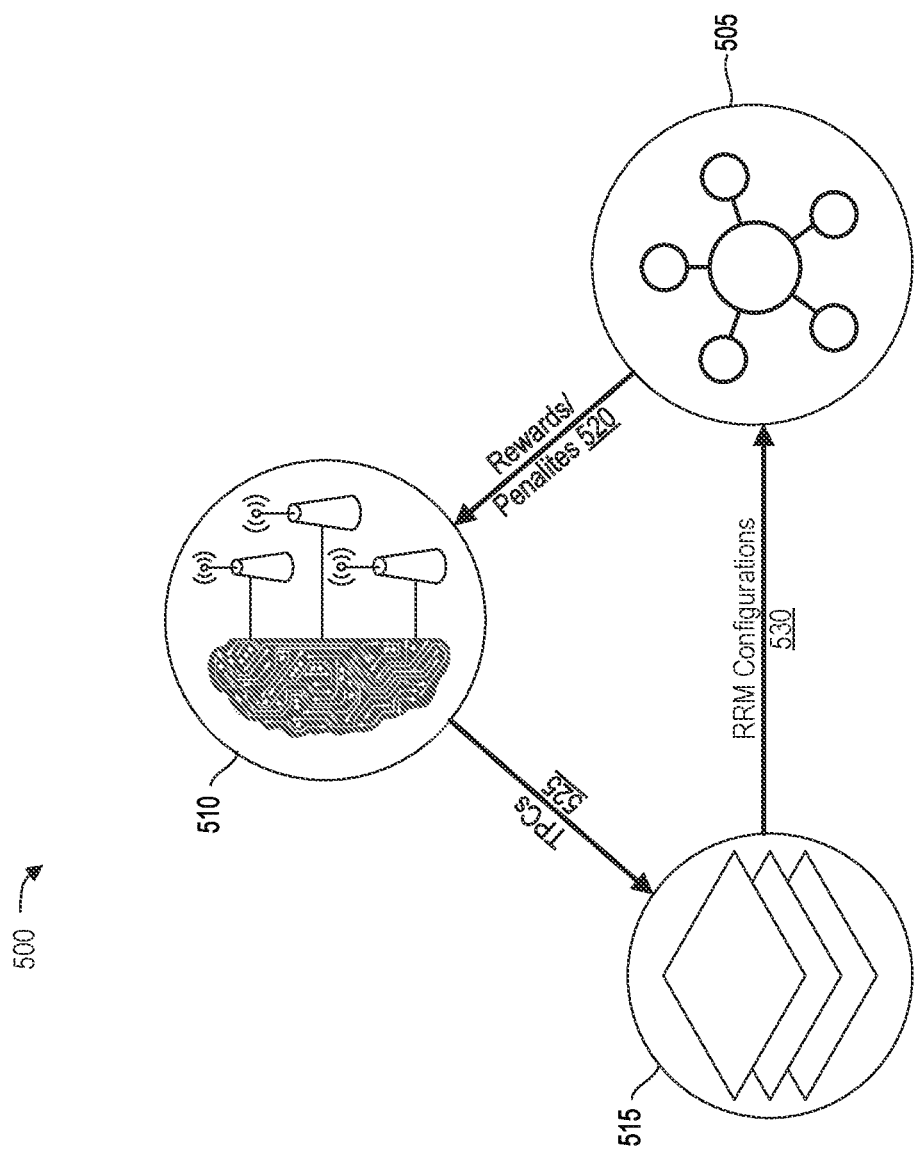
FIG. 5 is a conceptual diagram of a system that is configured to generate adaptive transmit power control (TPC) recommendations in accordance with some aspects of the disclosure.

FIG. 5 is a conceptual diagram of a system that is configured to generate adaptive transmit power control threshold recommendations in accordance with some aspects of the disclosure. In some aspects, the system 500 is configured to measure and record data (e.g., wireless networking information such as devices, connections, connection modification, retransmissions, failures, etc.), and adjust operation of the wireless network based on optimizations identified by the system 500. For example, the system 500 may generate TPCs every weeknight for an office building or may generate TPCs for an entertainment event in an events space.

In one aspect, the APs of the wireless network are configured to use an NDP in a network that uses electrical conductors (e.g., Ethernet) and share information. The APs in this example may share transit power information based on beacons to be transmitted. When other APs are able to receive a broadcasted beacon from the AP, the APs can determine a path loss for that AP. As will be described below, measuring the path loss can be used to build a graph that represents the physical space for simulating network behavior.

In some aspects, the system 500 includes a network analyzer 505, a threshold generator 510, and an RRM simulator 515. The network analyzer 505 is initially configured to receive configuration information and identify metrics associated with a wireless network's operation. For example, the system 500 may be configured to use daily measured TPCs to adjust the configuration of a wireless network, and the system 500 initially provides RRM configurations of the measured network data to the network analyzer 505. The network analyzer 505 analyzes the wireless network data based on measured data (e.g., the daily network information recorded and made available to the system 500) and identifies rewards and penalties. For example, if an AP provides an average of 200 megabits per section (Mbps) to a group of STAs that are consuming video services, the network analyzer 505 may determine that the AP receives a reward, and an AP that has an average retransmission rate of 20% receives a penalty.

In some aspects, the network analyzer 505 may analyze the network performance based on the perspective of each AP and based on the perspective of each STA. For example, the network analyzer 505 determines metrics associated with an AP's performance, such as the retransmission rate, an average error rate, a network inference over time (e.g., in dBm per hour), and so forth. The network analyzer 505 also considers the experience of the STA, such as the modulation coding scheme (MCS), data rate, etc. The network analyzer 505 may also compute a spectral efficiency or another compound factor that provides a relationship to the channel provided by the AP and consumed by the STA.

The rewards/penalties 520 are provided to the threshold generator 510, which determines new TPC values for at least a portion of the APs. In some aspects, the threshold generator 510 may be a rule-based approach that uses logic to provide incremental changes to TPC settings based on the rewards and penalties. For example, neighboring APs may receive a reward, and the threshold generator 510 increase a TPC setting for each AP.

The threshold generator 510 provides the modified TPCs 525 to the RRM simulator 515 to simulate the performance of the wireless network based on the TPCs 525. In one aspect, the RRM simulator 515 uses the measured network data and processes the data by modifying transmission power to the APs and identifying downstream effects. For example, increasing transmission power can cause an STA to experience greater noise at a particular location. The RRM simulator 515 also simulates the effects of the power changes by APs and responses of the STAs, such as change when the STA attempts to reselect to a different AP. Based on the simulations, the simulated RRM data 530 is provided to the network analyzer 505, which then computes metrics associated with the results.

In some aspects, the network analyzer 505 is configured to prune data when the RF environment is unstrained and channels are readily available. For example, with fewer network connections in early morning operation, the network data is not representative of strained operation and the network analyzer 505 can limit the amount of simulation based on unstrained data. The network analyzer 505 may also use measured network information to identify losses associated with objects (e.g., people) to simulate the wireless network in a strained environment.

The system 500 is configured to iteratively modify candidate TPCs to a plurality of network APs and provide guidance to network configuration. In some aspects, the system 500 may also promulgate the TPCs into APs to reduce the management of the wireless network.

Figure 6:
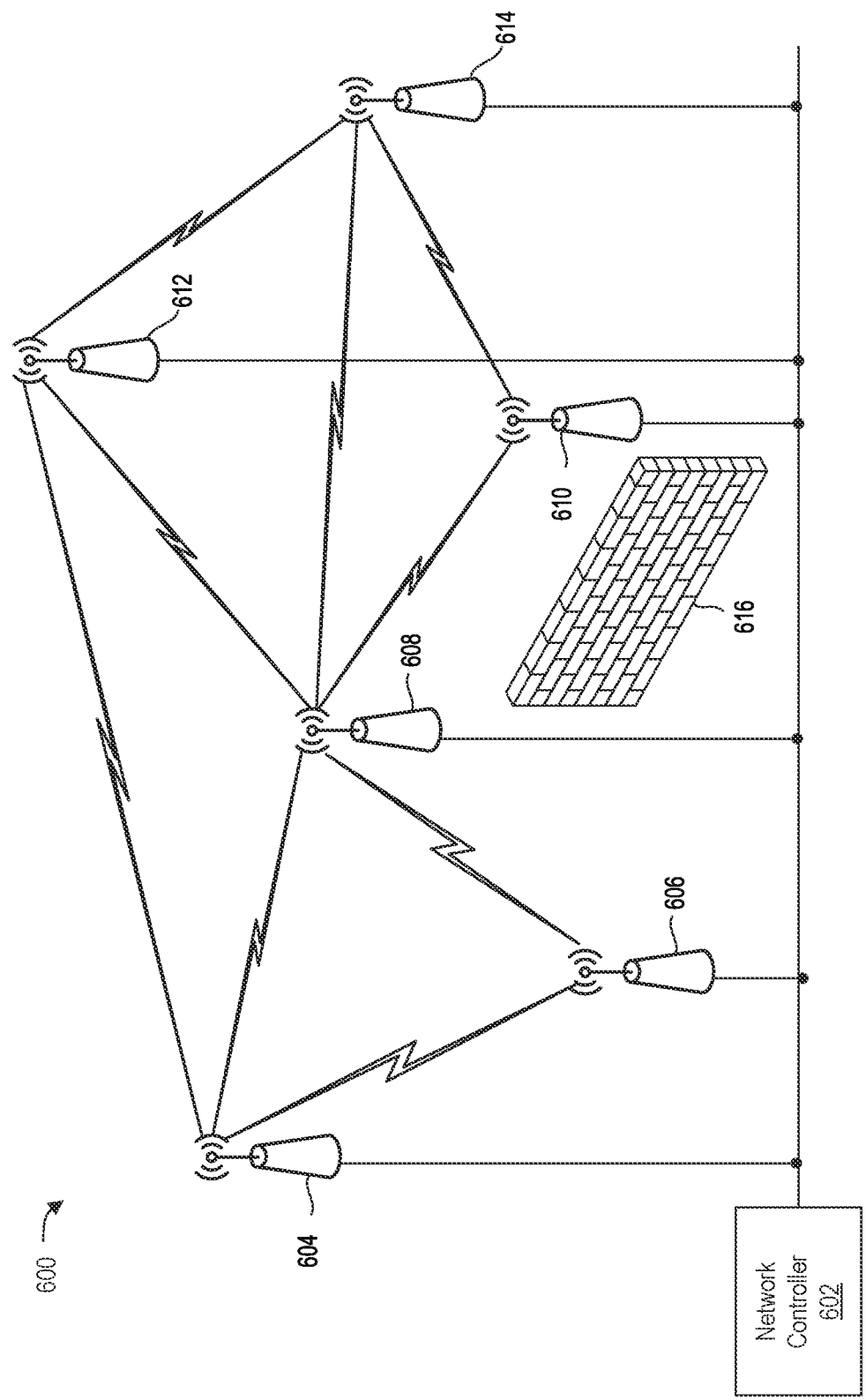
FIG. 6 illustrates a diagram of a wireless network that is configured to implement adaptive TPC recommendations in accordance with some aspects of the disclosure.

FIG. 6 illustrates a diagram of a wireless network 600 that is configured to implement adaptive TPC recommendations in accordance with some aspects of the disclosure. The wireless network 600 includes a network controller 602 that is configured to receive adaptive TPCs from, for example, the system 500.

In one illustrative aspect, the wireless network 600 includes a plurality of APs. In this case, a first AP 604, second AP 606, third AP 608, fourth AP 610, fifth AP 612, and sixth AP 614 are illustrated for illustrative purposes. Each of the APs 604-614 is connected to the network controller using a conductive medium (e.g., an Ethernet network cable). For example, the network controller 602 may provide network access to the APs, which then enables wireless devices to connect to the APs and receive network service.

In this case, some of the APs are within a communication range, for example, the first AP 604 can send and receive signals to the second AP 606, the third AP 608, and the fifth AP 612. The APs are connected to the network controller 602 and may share information related to their transmissions. For example, the first AP 604 may broadcast information related to a beacon the first AP 604 will transmit, such as a channel identification and a transmission power. The second AP 606, the third AP 608, the fourth AP 610, the fifth AP 612, and the sixth AP 614 can attempt to receive the beacon and determine a path loss. In this case, various APs may not receive the message because of the transmission frequency, power, and so forth. For example, RF signals may penetrate solid objects (e.g., walls) with a loss that is exponentially related to frequency. Signals in the 6 GHz frequency band may not be received in the event a solid object, such as a wall 616, is placed between two APs.

In this case, the second AP 606, the third AP 608, and the fifth AP 612 receive the beacon and may compute a path loss based on a received signal strength. In some cases, the path loss is provided to the network controller 602, which can record the data in storage (e.g., object storage, block storage, file storage, a database, etc.).

In conventional TPC control schemes, the control mechanisms are based on RSSI and do not consider various intervening factors, such as loss due to frequency, loss due to objects within the environment. The conventional TPC schemes estimate losses and are unable to provide a complete understanding of the physical environment and do not consider factors such as spectral efficiency, the experience of the STA, and so forth. Aspects of the disclosure provide a more complete understanding of the RF environment and identify TPC values based on simulations of the wireless network in a busy state and with channel losses (e.g., RF loss) associated with the objects (e.g., people) in the busy state.

Channel losses are affected by distance from the transmission source, objects within the environment, and the frequency. For example, the wall 616 that is positioned between the second AP 606 and the fourth AP 610 can prevent a signal transmitted from either AP from being received. For example, losses are exponentially related to the frequency, and 5 GHz and 6 GHz signals typically do not penetrate objects. The object's characteristics are also relevant too, with hard, denser materials causing more loss than softer, light materials.

In this case, the system (e.g., the system 500) may be configured to model the location of the APs based on a channel loss, which can also be referred to as RF distance and corresponds to a loss. As described above, the channel loss does not necessarily correlate to the physical distance. For example, the physical distance between the first AP 604 and the fifth AP 612 is greater than the distance between the second AP 606 and the fourth AP 610, but the channel loss between the second AP 606 and the fourth AP 610 is much greater than the loss between the first AP 604 and the fifth AP 612. For example, as described above, any transmission from the second AP 606 is not received by the fourth AP 610 due to the losses due to wall 616.

In some cases, the channel loss associated with the wall 616 may not adversely affect lower frequencies (e.g., 2.4 GHZ) and the second AP 606 and the fourth AP 610 may be able to receive each other's beacons. In some aspects, the model of the location of the APs may be a function that receives at least one parameter (e.g., frequency). The modeling of the location of the APs and understanding the physical and electromagnetic (e.g., RF) environment is challenging, and using conventional techniques (e.g., using RSSI to identify distance) may not yield accurate configurations.

According to some aspects, the system 500 is configured to build a better model by determining path loss based on communication on the backend (e.g., the physical network). For example, in FIG. 6, the first AP 604, the second AP 606, the third AP 608, the fourth AP 610, the fifth AP 612, and the sixth AP 614 may be able to communicate using a LAN to identify neighbor devices and transmit information related to beacons. In some cases, one or more of the APs can be power limited based on low-power indoor (LPI) requirements associated with an unlicensed frequency band, such as the 6 GHz band. In this case, the APs can broadcast a message to devices in the backend and identify a beacon that will be transmitted at a particular time at a specific power. In this case, the second AP 606, the third AP 608, and the fifth AP 612 can determine a path loss, and the fourth AP 610 and the sixth AP 614 can determine that they are not within a communication range of the wireless channel of the first AP 604. Further descriptions of the communication and aggregation of information by the APs is further discussed in FIG. 7.

Figure 7:
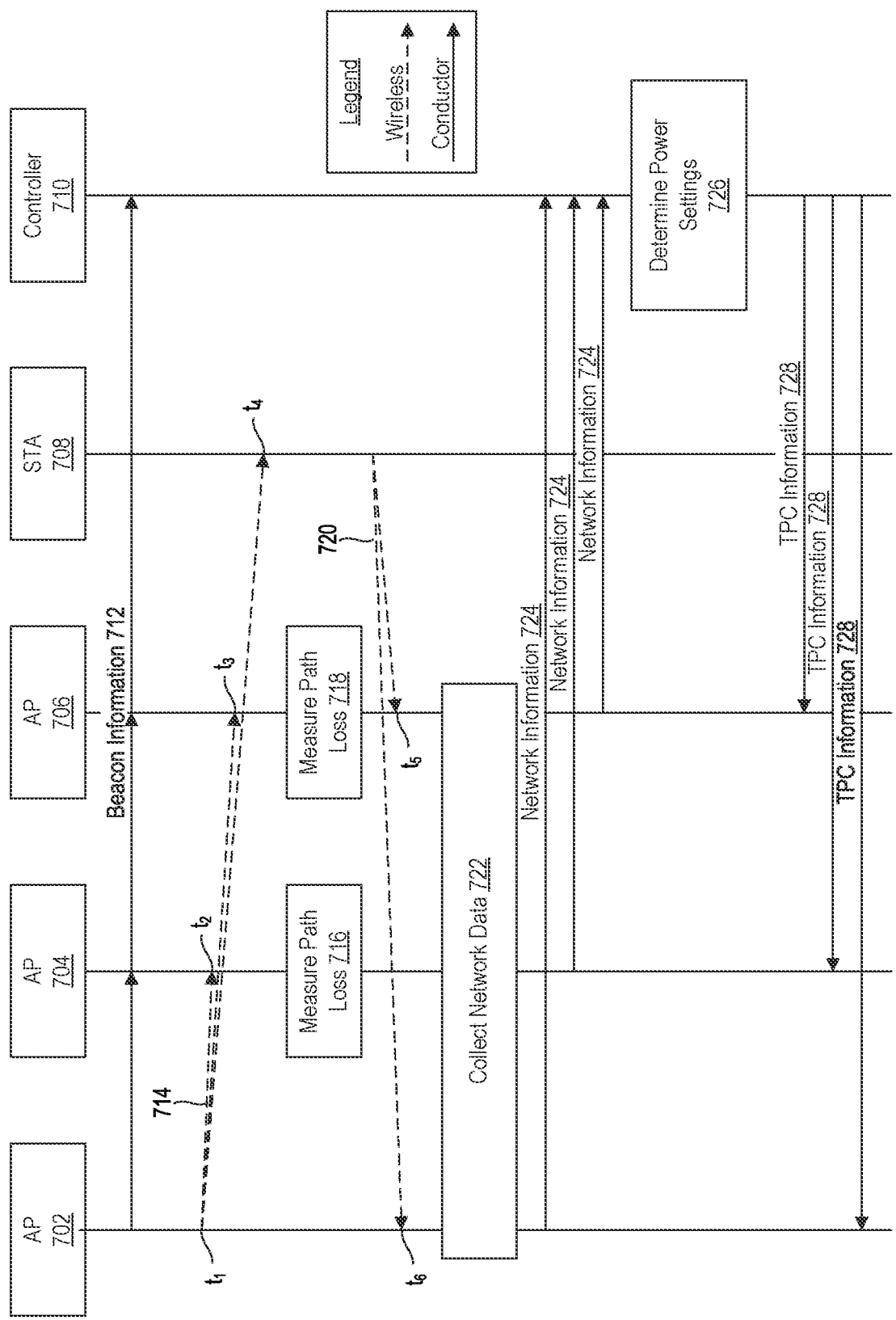
FIG. 7 is a sequence diagram of a system that is configured to generate adaptive TPC recommendations in accordance with some aspects of the disclosure.

FIG. 7 is a sequence diagram of a system 700 that is configured to generate adaptive TPC recommendations in accordance with some aspects of the disclosure. In some cases, the system includes a first AP 702, a second AP 704, a third AP 706, and a controller 710. For purposes of illustration, the system 700 includes at least one STA 708 that is configured to connect to the network through one of the APs.

In this case, a first AP 702 may have exchanged information within the network and can coordinate with the various devices using NDP on a conductor-based network associated with the backend (e.g., an Ethernet network). The AP 702 may be configured to periodically broadcast beacon information 712 to the AP 704, the AP 706, and the controller 710 which provides power information, channel, and timing information related to the beacon.

The AP 704 transmits a beacon 714 on the wireless channel and time to, and the beacon 714 is received by the second AP 704 at time $t_1$, the third AP 706 at time $t_2$, and the STA 708 at time $t_3$. In this case, the second AP 704 may be communicating on different channels and may determine whether it can monitor the channel associated with the beacon. For example, two different devices are connected on channel 35 to the second AP 704, but because both devices communicate infrequently, the second AP 704 may not permit the devices to schedule a transmission and the second AP 704 can monitor the channel associated with the beacon 714.

At block 716, the second AP 704 is configured to measure a path loss, and at block 718, the third AP 706 is configured to measure a path loss. In some aspects, the second AP 704 and the third AP 706 may also be configured to measure a delay associated with the beacon 714. For example, the second AP 704 and the third AP 706 can identify a delay that occurs in transmission due to propagation of the RF and may be able to use the time to identify a distance. In some aspects, the delay can be in picoseconds and the various components need an accurate reference to determine a distance. For example, the first AP 702, the second AP 704, and the third AP 706 may be configured to transmit information with picosecond accuracy and may allow physical distance to be determined.

According to aspects of the disclosure, the first AP 702, the second AP 704, and the third AP 706 collect relevant network data related to the operation of the network, such as the beacons, as well as information from the STA 708. For example, the STA 708 may be configured to respond to the beacon 714 to attempt to the connect to the AP 702. In this case, the STA 708 transmits a reply 720 at time $t_4$, which is received by the AP 706 at time $t_5$ and the AP 702 at time $t_6$. The AP 706 receives the reply because at least one RF chain is temporarily tuned to the channel associated with the beacon 714. The AP 704 does not receive the reply 720 because it is not within communication range of the AP 704. In this case, the AP 702 and the AP 706 can receive and store the information within and extrapolated from the reply 720, and information can be extrapolated based on path loss, timing, absence of information, etc.

The first AP 702, the second AP 704, and the third AP 706 also collect information such as when an STA is reselecting, when the AP experiences transmission errors, average data rates and MCS associated with various devices, and so forth. The first AP 702, the second AP 704, and the third AP 706 each provide the collected network information 724 to the controller 710 for use in simulations as described above. For example, the system 500 can determine the spectral efficiency based on the collected information.

At block 726, the controller 710 can determine power settings associated with the first AP 702, the second AP 704, and the third AP 706. For example, the controller 710 can run an ML model that builds an overview of the APs and the paths between each AP and identify and predict how an STA will operate in this space. In one illustrative example, the controller 710 can build a graph that models the wireless network and can be used, to simulate performance of the wireless network based on the model and identify TPC levels for each of the first AP 702, the second AP 704, and the third AP 706.

At block 726, the controller 710 may determine information related to performance of APs and STAs. For example, the controller 710 determines a spectral quality associated with each AP that identifies a performance metric and corresponds to efficiency and determines wireless connectivity information (e.g., MCS, average data rate, transmission efficiency, SNR, retransmission statistics, a volume of network data, etc.). In some cases, the controller 710 can group STAs based on MCS and SNR to create a matrix, and analyze the performance of the AP based on the groupings. In one aspect, the controller 710 can also represent information as a time-series data that corresponds to changes over time, which can allow the controller 710 to prioritize the simulation of particular STAs.

In some aspects, the controller 710 can also use a rule-based approach to determine TPCs for each AP. For example, the set of rules can use the spectral quality, connectivity information of various STAs, network performance, and so forth to determine a TPC.

The controller 710 may also consider floor and ceiling aspects to improve the overall experience. For example, the controller 710 can estimate a minimum performance of STAs, a maximum performance of STAs, and an average performance. The controller can determine a standard deviation based on the simulations and modify the various settings to reduce performance deviation.

In one example, the controller 710 may be configured to provide TPC information 728 to the first AP 702, the second AP 704, and the third AP 706. In another example, the controller 710 may provide a report with recommended TPC settings to a network administrator.

Figure 8:
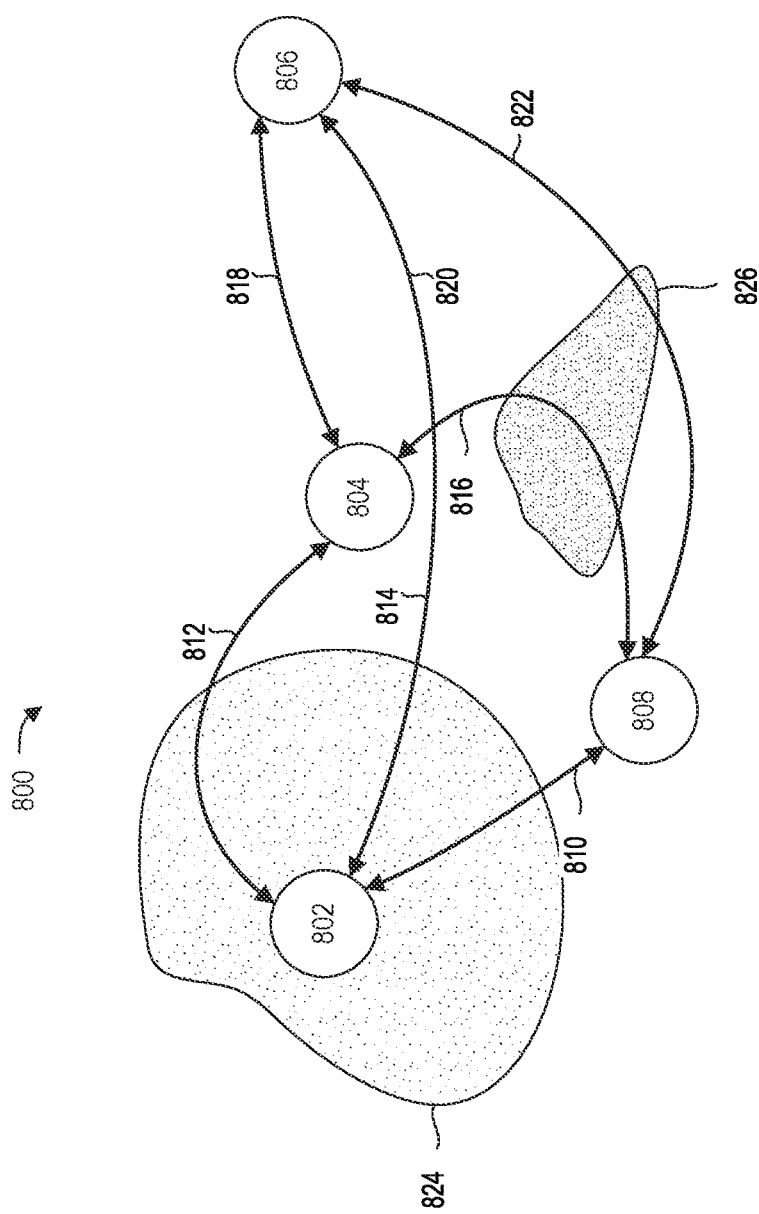
FIG. 8 is an illustration of a graph that graphically depicts relationships and lossy volumes in accordance with some aspects of the disclosure.

FIG. 8 is an illustration of a graph 800 that graphically depicts relationships and lossy volumes in accordance with some aspects of the disclosure. In some aspects, the graph 800 includes nodes 802, 804, 806, and 808, which represent a fixed asset such as an AP. The nodes are connected by edges 810, 812, 814, 816, 818, 820, and 822.

Each of the edges 810-822 represents a channel between corresponding nodes and may have an associated function that is associated with a channel loss. The channel loss is depicted by the non-linear properties of the edge, with the length of the edge corresponding to a channel loss (e.g., a path weight). For example, the edges experience more loss based on smaller curvatures of radius. In some aspects, the channel loss may be approximated even if the nodes are unable to directly communicate. For example, node 802 and node 806 may be separated by a physical distance that prevents direct measurements. However, even if node 802 and node 806 are unable to receive each other's messages, their communication range may overlap and a channel loss function can identify how transmissions affect a STA that is juxtaposed between the node 802 and node 806.

According to aspects of the disclosure, the graph may include regions 824 and 826, which can apply a bias to edges 810-822. For example, the region 826 may be associated with an object such as a dense wall that incurs a significant amount of loss. In another example, the region 822 may be associated with lossy objects within the environment. The regions 824 and 826 each approximate various losses that are associated with the loss and may be used to optimize transmission power of corresponding APs.

In some aspects, the graph 800 may be generated by a component of the system 500, such as the RRM simulator 515, and the network analyzer 505 may analyze wireless network performance based on RRM configurations. The graph 800 is a conceptual illustration of the complex relationships associated with a wireless network and illustrates an example of data structure than can be implemented by a wireless network controller system, such as the system 500.

Figure 9:
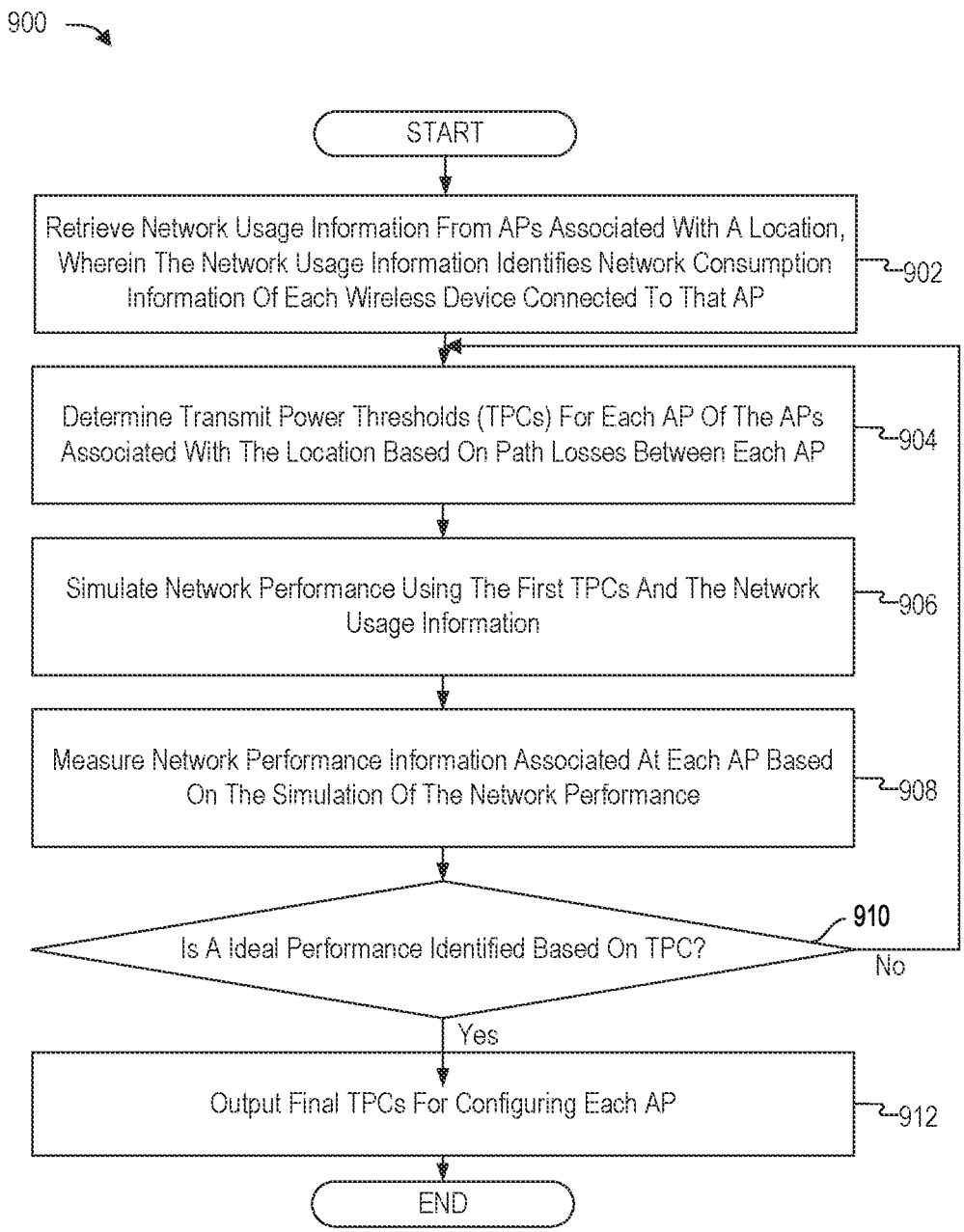
FIG. 9 illustrates an example method for generating adaptive TPC recommendations in accordance with some aspects of the disclosure.

FIG. 9 illustrates an example method for generating adaptive TPC recommendations in accordance with some aspects of the disclosure. Although the example method 900 depicts a particular sequence of operations, the sequence can be altered without departing from the scope of the present disclosure. For example, some of the operations depicted can be performed in parallel or in a different sequence that does not materially affect the function of the method 900. In other examples, different components of an example device or system that implements the method 900 can perform functions at substantially the same time or in a specific sequence. Although a network controller (e.g., the system 500, the network controller 602, etc.) is described as performing the method, this example is for descriptive purposes. The method may be performed in a distributed manner using cloud computing, various containers, microservices, and other techniques.

At block 902, the network controller may retrieve network usage information from APs associated with a location. The location can be a geographical area, such as a building that having a plurality of APs. In some cases, the APs can be associated with a single government entity (e.g., a business, a charity, a university, etc.). However, in some cases, the location can be associated with one entity within the location, and multiple entities be collocated proximate to that location (e.g., two entities on different floors). In some aspects, the network usage information identifies network consumption information of each wireless device connected to that AP, non-period events, and interrupts. For example, the network usage information from a first AP includes a path loss associated with messages from neighboring APs. The network controller may include a set of rules that synthesize spectral quality associated with each AP, wireless connectivity information of each wireless device, network performance information of each AP, and each wireless device.

In some aspects, each AP of the wireless network may be configured to transmit a message indicating a transmission power level associated with a beacon using a backhaul network connection. For example, a first AP can send information that includes at least a channel associated with a beacon, a transmission power level of that beacon, and a transmission time of that beacon. In some cases, adjacent APs may be able to receive the beacon and may then determine the path loss at receiving APs.

At block 904, the network controller may determine TPCs for each AP of the APs associated with the location based on path losses between each AP. As illustrated in FIG. 9, the determination of the TPCs may be an iterative process and the TPCs may be determined multiple times to simulate different wireless network configurations with respect to measured data during busy states in the network.

According to aspects of the disclosure, the determination of the TPC may include estimating a minimum performance, a maximum performance, and an average performance of each AP based on a TPC of each AP, determining at least one standard deviation based on the at least one of the minimum performance of the APs, the maximum performance of the APs, and the average performance of the APs, and iteratively adjusting the TPC of each AP to reduce the at least one standard deviation.

At block 906, the network controller may simulate network performance using the TPCs and the network usage information. For example, the network usage information may be daily collected information of the wireless network and may be pruned to remove immaterial data. For example, network traffic between midnight at 8:00 AM may be removed or may be heavily filtered. In one illustrative aspect of block 906, the network controller may estimate the dynamic path losses of each AP from the network usage information, and the dynamic path losses comprise dynamic loss at different times in different coverage areas of each AP.

At block 908, the network controller measures network information at each AP based on the simulation of the network performance. As described above, the measuring of the network information includes a variety of parameters, such as spectral efficiency, MCS, SNR, retransmissions, and so forth. In some cases, the network information can include a time to reselect, network transmission volume (e.g., in Gbps), average data rate, length connected to an AP, etc. In one illustrative example, the measuring of the network information may include determining a spectral quality associated with each AP; and determining the wireless connectivity information of each wireless device of wireless device. The measuring of the wireless connectivity information may include separating each of the wireless devices into a plurality of groups based on a modulation and coding scheme and determining an SNR of the wireless devices with each group.

According to some aspects, the network controller may, to measure the network information, identify at least one network performance information associated with communication between an AP and a wireless device. For example, the network performance information can be a time-series data that represents the wireless device (e.g., STA) as it moves through the RF environment. For example, the network performance information comprises at least one of interference caused by an intervening device, volume of network traffic, and a quantity of transmission retries.

At block 910, the network controller determines if the network performance corresponds to a maximum performance based on at least a group of TPCs associated with the wireless network. For example, when a maximum performance of a supermajority of APs (e.g., 70%) and 20% of the APs are deemed to be within a range associated with the maximum performance, the network controller may determine the maximum performance is identified. The maximum performance is not ideal best performance, but peak or close to peak performance based on the arrangement, location, and limitations associated with the wireless network.

If the maximum performance is not identified at block 910, the network controller may return to block 904 to iterate on different TPC settings based on the simulation at block 906. In some aspects, the network controller can determine feedback when the maximum performance is not identified, and the feedback can be used in block 904 to further adjust the TPC based on the rewards. For example, if an AP causes 10% additional interference based on increasing the transmission power, the network controller may apply a penalty for that AP. That is, the network controller may determine feedback for each AP based on the simulation of the network performance, wherein subsequent TPCs are generated based on the prior TPCs and the feedback.

If the maximum performance, or the ideal simulated performance, is identified at block 910, the network controller proceeds to block 910 and outputs final TPCs for configuring at least a group of the APs. In one example of block 910, the network controller may generate a TPC report identifying a final TPC for each AP, wherein each final TPC of the set of final TPCs is configured to minimize cochannel interference and minimize roaming between different APs. In another example of block 910, the network controller may configure each AP with a final TPC, which is configured to minimize cochannel interference of each AP and minimize roaming between different APs.

Figure 10:
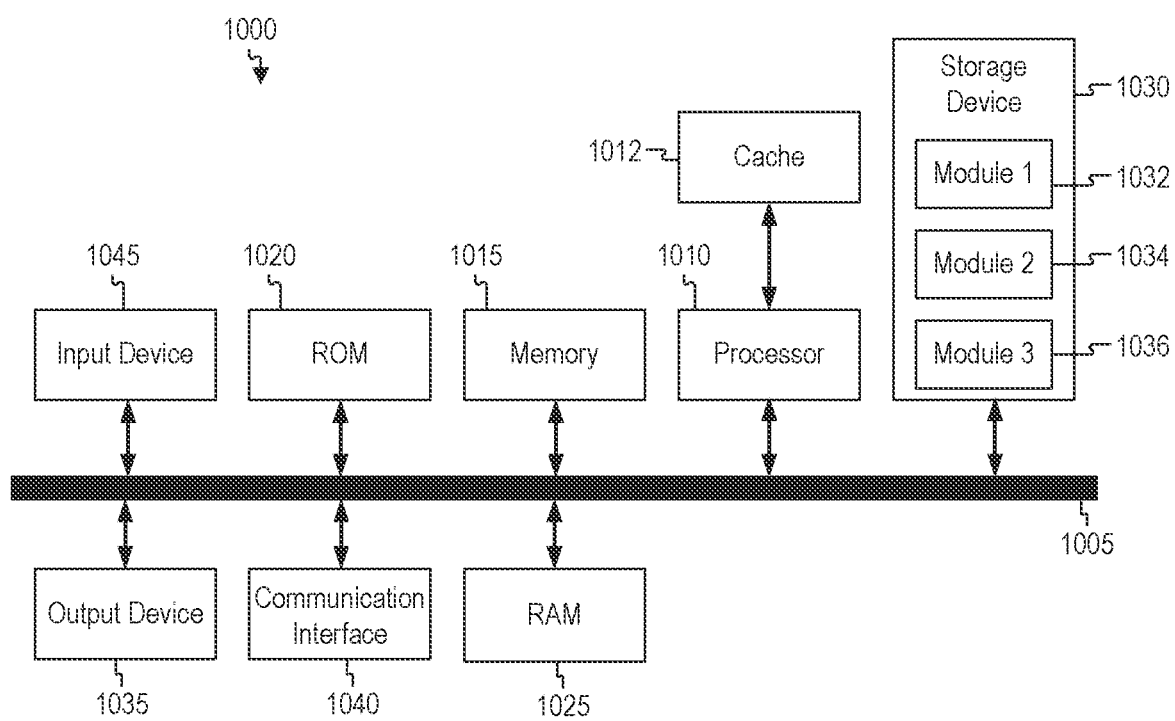
FIG. 10 shows an example of a computing system, which can be for example any computing device that can implement components of the system.

FIG. 10 shows an example of computing system 1000, which can be for example any computing device making up the various roles described above or any component thereof in which the components of the system are in communication with each other using connection1 005. Connection 1005 can be a physical connection via a bus, or a direct connection to processor 1010, such as in a chipset architecture. Connection 1005 can also be a virtual connection, networked connection, or logical connection.

In some embodiments, computing system 1000 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 1000 includes at least one processing unit (CPU or processor) 1010 and connection 1005 that couples various system components including system memory 1015, such as read only memory (ROM) 1020 and random access memory (RAM) 1025 to processor 1010. Computing system 1000 can include a cache of high-speed memory 1012 connected directly with, in close proximity to, or integrated as part of processor 1010.

Processor 1010 can include any general purpose processor and a hardware service or software service, such as services 1032, 1034, and 1036 stored in storage device 1030, configured to control processor 1010 as well as a special-purpose processor where software instructions are incorporated into the actual processor design. Processor 1010 can essentially be a completely self-contained computing system, containing multiple cores or processors, a bus, memory controller, cache, etc. A multi-core processor can be symmetric or asymmetric.

To enable user interaction, computing system 1000 includes an input device 1045, which can represent any number of input mechanisms, such as a microphone for speech, a touch-sensitive screen for gesture or graphical input, keyboard, mouse, motion input, speech, etc. Computing system 1000 can also include output device 1035, which can be one or more of a number of output mechanisms known to those of skill in the art. In some instances, multimodal systems can enable a user to provide multiple types of input/output to communicate with computing system 1000. Computing system 1000 can include communications interface 1040, which can generally govern and manage the user input and system output. There is no restriction on operating on any particular hardware arrangement and therefore the basic features here can easily be substituted for improved hardware or firmware arrangements as they are developed.

Storage device 1030 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 1030 can include software services, servers, services, etc., that when the code that defines such software is executed by the processor 1010, it causes the system to perform a function. In some embodiments, a hardware service that performs a particular function can include the software component stored in a computer-readable medium in connection with the necessary hardware components, such as processor 1010, connection 1005, output device 1035, etc., to carry out the function.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

For clarity of explanation, in some instances, the present technology can be presented as including individual functional blocks including functional blocks comprising devices, device components, steps or routines in a method embodied in software, or combinations of hardware and software.

Any of the steps, operations, functions, or processes described herein can be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general-purpose computer, special purpose computer, or special purpose processing device to perform a certain function or group of functions. Portions of computer resources used can be accessible over a network. The computer executable instructions can be, for example, binaries, intermediate format instructions such as assembly language, firmware, or source code. Examples of computer-readable media that can be used to store instructions, information used, and/or information created during methods according to described examples include magnetic or optical disks, solid state memory devices, flash memory, universal serial bus (USB) devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter can have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Illustrative examples of the disclosure include:

Aspect 1. A method for configuring at least one network access point (AP), comprising: retrieving network usage information from APs associated with a location, wherein the network usage information identifies network consumption information of each wireless device connected to that AP, non-period events, and interrupts, wherein the network usage information from a first AP includes a path loss associated with messages from neighboring APs; determining first transmit power thresholds (TPCs) for each AP of the APs associated with the location based on path losses between each AP; simulating network performance using the first TPCs and the network usage information; measuring network performance information associated at each AP based on the simulation of the network performance; and determining second TPCs for each AP of the APs associated with the location based on the network information.

Aspect 2. The method of Aspect 1, wherein measuring the network information associated at each AP and each wireless device within the geographic region comprises at least one of: determining a spectral quality associated with each AP; and determining wireless connectivity information of each wireless device of the wireless device.

Aspect 3. The method of any of Aspects 1 to 2, wherein measuring the wireless connectivity information of each wireless device comprises: separating each of the wireless devices into a plurality of groups based on a modulation and coding scheme; and determining a signal to noise ratio (SNR) of the wireless devices with each group.

Aspect 4. The method of any of Aspects 1 to 3, wherein measuring the network information associated at each AP and each wireless device within the geographic region comprises: identifying at least one network performance information associated with communication between an AP and a wireless device.

Aspect 5. The method of any of Aspects 1 to 4, wherein the network performance information comprises at least one of interference caused by an intervening device, volume of network traffic, and a quantity of retries.

Aspect 6. The method of any of Aspects 1 to 5, wherein determining second TPCs for each AP of the APs associated with the location based on the network information comprises a set of rules that synthesize spectral quality associated with each AP, wireless connectivity information of each wireless device, network performance information of each AP and each wireless device.

Aspect 7. The method of any of Aspects 1 to 6, further comprising: determining feedback for each AP based on the simulation of the network performance, wherein an initial value of the second TPCs are generated based on the first TPCs and the feedback.

Aspect 8. The method of any of Aspects 1 to 7, wherein simulating the network performance using the first TPCs and the network usage information comprises: estimating dynamic path losses of each AP from the network usage information, wherein the dynamic path losses comprise dynamic loss at different times in different coverage areas of each AP.

Aspect 9. The method of any of Aspects 1 to 8, wherein determining of the first TPCs comprises: estimating a minimum performance, a maximum performance, and an average performance of each AP based on a TPC of each AP; determining at least one standard deviation based on the at least one of the minimum performance of the APs, the maximum performance of the APs, and the average performance of the APs; and iteratively adjusting the TPC of each AP to reduce the at least one standard deviation.

Aspect 10. The method of any of Aspects 1 to 9, generating a TPC report identifying a final TPC for each AP, wherein each final TPC of the set of final TPCs is configured to minimize cochannel interference and minimize roaming between different APs.

Aspect 11. The method of any of Aspects 1 to 10, further comprising: configuring each AP with a final AP, wherein each final TPC is configured to minimize cochannel interference of each AP and minimize roaming between different APs.

Aspect 12. The method of any of Aspects 1 to 11, wherein each AP is configured to transmit a message on a indicating a transmission power level associated with a beacon using a backhaul network connection.

Aspect 13. The method of any of Aspects 1 to 12, wherein the first AP receives a message from each AP on the backhaul network that identifies a beacon transmission and a transmission power of the beacon transmission and determines the path loss based on the transmission power and a received power of the beacon.

Aspect 14. The method of any of Aspects 1 to 13, further comprising: determining an RF distance associated with each AP; and mapping each AP into a graph as nodes and determining path weights between each node based on the path losses.

Aspect 15. A system for providing adaptive transmit power control threshold recommendations includes a storage (implemented in circuitry) configured to store instructions and a processor. The processor configured to execute the instructions and cause the processor to: retrieve network usage information from APs associated with a location, wherein the network usage information identifies network consumption information of each wireless device connected to that AP, non-period events, and interrupts, wherein the network usage information from a first AP includes a path loss associated with messages from neighboring APs; determine first transmit power thresholds (TPCs) for each AP of the APs associated with the location based on path losses between each AP; simulate network performance using the first TPCs and the network usage information; measure network performance information associated at each AP based on the simulation of the network performance; and determine second TPCs for each AP of the APs associated with the location based on the network information.

Aspect 16. The system of Aspect 15, wherein measuring the network information associated at each AP and each wireless device within the geographic region comprises at least one of: determine a spectral quality associated with each AP; and determine wireless connectivity information of each wireless device of the wireless device.

Aspect 17. The system of any of Aspects 15 to 16, wherein the processor is configured to execute the instructions and cause the processor to: separate each of the wireless devices into a plurality of groups based on a modulation and coding scheme; and determine a signal to noise ratio (SNR) of the wireless devices with each group.

Aspect 18. The system of any of Aspects 15 to 17, wherein the processor is configured to execute the instructions and cause the processor to: identify at least one network performance information associated with communication between an AP and a wireless device.

Aspect 19. The system of any of Aspects 15 to 18, wherein the network performance information comprises at least one of interference caused by an intervening device, volume of network traffic, and a quantity of retries.

Aspect 20. The system of any of Aspects 15 to 19, wherein the second TPCs is based on a set of rules that synthesize spectral quality associated with each AP, wireless connectivity information of each wireless device, network performance information of each AP and each wireless device.

Aspect 21. The system of any of Aspects 15 to 20, wherein the processor is configured to execute the instructions and cause the processor to: determine feedback for each AP based on the simulation of the network performance, wherein an initial value of the second TPCs are generated based on the first TPCs and the feedback.

Aspect 22. The system of any of Aspects 15 to 21, wherein the processor is configured to execute the instructions and cause the processor to: estimate dynamic path losses of each AP from the network usage information, wherein the dynamic path losses comprise dynamic loss at different times in different coverage areas of each AP.

Aspect 23. The system of any of Aspects 15 to 22, wherein the processor is configured to execute the instructions and cause the processor to: estimate a minimum performance, a maximum performance, and an average performance of each AP based on a TPC of each AP; determine at least one standard deviation based on the at least one of the minimum performance of the APs, the maximum performance of the APs, and the average performance of the APs; and iteratively adjust the TPC of each AP to reduce the at least one standard deviation.

Aspect 24. The system of any of Aspects 15 to 23, wherein the processor is configured to execute the instructions and cause the processor to: generate a TPC report identifying a final TPC for each AP, wherein each final TPC of the set of final TPCs is configured to minimize cochannel interference and minimize roaming between different APs.

Aspect 25. The system of any of Aspects 15 to 24, wherein the processor is configured to execute the instructions and cause the processor to: configure each AP with a final AP, wherein each final TPC is configured to minimize cochannel interference of each AP and minimize roaming between different APs.

Aspect 26. The system of any of Aspects 15 to 25, wherein each AP is configured to transmit a message on a indicating a transmission power level associated with a beacon using a backhaul network connection.

Aspect 27. The system of any of Aspects 15 to 26, wherein the first AP receives a message from each AP on the backhaul network that identifies a beacon transmission and a transmission power of the beacon transmission and determines the path loss based on the transmission power and a received power of the beacon.

Aspect 28. The system of any of Aspects 15 to 27, wherein the processor is configured to execute the instructions and cause the processor to: determine an RF distance associated with each AP; and map each AP into a graph as nodes and determining path weights between each node based on the path losses.

Aspect 29. A non-transitory computer-readable medium comprising instructions which, when executed by one or more processors, cause the one or more processors to perform operations according to any of Aspects 1 to 14.

Aspect 30. An apparatus comprising means for performing operations according to any of Aspects 1 to 14.

What is claimed is:
1. A method for configuring at least one network access point (AP), comprising:
    retrieving network usage information from APs associated with a location, wherein the network usage information identifies network consumption information of each wireless device connected to that AP, non-period events, and interrupts, wherein the network usage information from a first AP includes a path loss associated with messages from neighboring APs;
    determining first transmit power thresholds (TPCs) for each AP of the APs associated with the location based on path losses between each AP;
    simulating network performance using the first TPCs and the network usage information;
    measuring network performance information associated at each AP based on the simulation of the network performance; and
    determining second TPCs for each AP of the APs associated with the location based on the network performance information.

2. The method of claim 1, wherein measuring the network performance information associated at each AP and each wireless device within a geographic region comprises at least one of:
    determining a spectral quality associated with each AP; and
    determining wireless connectivity information of each wireless device of the wireless device.

3. The method of claim 2, wherein measuring the wireless connectivity information of each wireless device comprises:
    separating each of the wireless devices into a plurality of groups based on a modulation and coding scheme; and
    determining a signal to noise ratio (SNR) of the wireless devices with each group.

4. The method of claim 1, wherein measuring the network performance information associated at each AP and each wireless device within a geographic region comprises:
    identifying at least one network performance information associated with communication between an AP and a wireless device.

5. The method of claim 4, wherein the network performance information comprises at least one of interference caused by an intervening device, volume of network traffic, and a quantity of retries.

6. The method of claim 1, wherein determining second TPCs for each AP of the APs associated with the location based on the network performance information comprises a set of rules that synthesize spectral quality associated with each AP, wireless connectivity information of each wireless device, network performance information of each AP and each wireless device.

7. The method of claim 1, further comprising:
    determining feedback for each AP based on the simulation of the network performance, wherein an initial value of the second TPCs are generated based on the first TPCs and the feedback.

8. The method of claim 1, wherein simulating the network performance using the first TPCs and the network usage information comprises:
    estimating dynamic path losses of each AP from the network usage information, wherein the dynamic path losses comprise dynamic loss at different times in different coverage areas of each AP.

9. The method of claim 1, wherein determining of the first TPCs comprises:
    estimating a minimum performance, a maximum performance, and an average performance of each AP based on a TPC of each AP;

determining at least one standard deviation based on the at least one of the minimum performance of the APs, the maximum performance of the APs, and the average performance of the APs; and iteratively adjusting the TPC of each AP to reduce the at least one standard deviation.

10. The method of claim 1, generating a TPC report identifying a final TPC for each AP, wherein each final TPC of the TPC report is configured to minimize cochannel interference and minimize roaming between different APs.

11. The method of claim 1, further comprising:
configuring each AP with a final AP, wherein each final TPC is configured to minimize cochannel interference of each AP and minimize roaming between different APs.

12. The method of claim 1, wherein each AP is configured to transmit a message on a indicating a transmission power level associated with a beacon using a backhaul network connection.

13. The method of claim 12, wherein the first AP receives a message from each AP on a backhaul network that identifies a beacon transmission and a transmission power of the beacon transmission and determines the path loss based on the transmission power and a received power of the beacon.

14. The method of claim 1, further comprising:
determining an RF distance associated with each AP; and
mapping each AP into a graph as nodes and determining path weights between each node based on the path losses.

15. A system for providing adaptive transmit power control threshold recommendations, comprising:
a storage configured to store instructions;
a processor configured to execute the instructions and cause the processor to:
retrieve network usage information from APs associated with a location, wherein the network usage information identifies network consumption information of each wireless device connected to that AP, non-period events, and interrupts, wherein the network usage information from a first AP includes a path loss associated with messages from neighboring APs;
determine first transmit power thresholds (TPCs) for each AP of the APs associated with the location based on path losses between each AP;
simulate network performance using the first TPCs and the network usage information;
measure network performance information associated at each AP based on the simulation of the network performance; and
determine second TPCs for each AP of the APs associated with the location based on the network performance information.

16. The system of claim 15, wherein the processor is configured to execute the instructions and cause the processor to:
determine a spectral quality associated with each AP; and
determine wireless connectivity information of each wireless device of the wireless device.

17. The system of claim 16, wherein the processor is configured to execute the instructions and cause the processor to:
separate each of the wireless devices into a plurality of groups based on a modulation and coding scheme; and
determine a signal to noise ratio (SNR) of the wireless devices with each group.

18. The system of claim 15, wherein the processor is configured to execute the instructions and cause the processor to:
identify at least one network performance information associated with communication between an AP and a wireless device.

19. The system of claim 18, wherein the network performance information comprises at least one of interference caused by an intervening device, volume of network traffic, and a quantity of retries.

20. The system of claim 15, wherein determining second TPCs for each AP of the APs associated with the location based on the network information comprises a set of rules that synthesize spectral quality associated with each AP, wireless connectivity information of each wireless device, network performance information of each AP and each wireless device.

* * * * *